(12) United States Patent
Mengel

(10) Patent No.: US 6,299,397 B1
(45) Date of Patent: Oct. 9, 2001

(54) DOUBLE ENDED EXPANSION FASTENER

(76) Inventor: Craig Mengel, 904 E. 7th St., Lamar, MO (US) 64759

( * ) Notice: Subject to any disclaimer, the term of this patent is extended or adjusted under 35 U.S.C. 154(b) by 0 days.

(21) Appl. No.: 09/598,277

(22) Filed: Jun. 22, 2000

(51) Int. Cl.⁷ .............................. F16B 13/04; F16B 13/06
(52) U.S. Cl. ................................ 411/24; 411/33; 411/54; 411/60.1; 411/25
(58) Field of Search .................. 411/24, 25, 26, 411/32, 33, 60.1, 354, 54

(56) References Cited

U.S. PATENT DOCUMENTS

| | | | |
|---|---|---|---|
| 2,937,666 | * | 5/1960 | Maisch ................................ 411/24 X |
| 3,042,094 | * | 7/1962 | Liljeberg ............................... 411/271 |
| 3,438,659 | * | 4/1969 | Waldron .............................. 411/24 X |
| 3,911,782 | * | 10/1975 | Liebig ..................................... 411/24 |
| 5,314,278 | | 5/1994 | Weber ..................................... 411/61 |
| 5,562,375 | | 10/1996 | Jackson ................................... 411/48 |
| 5,664,900 | | 9/1997 | Matthies ............................... 403/297 |
| 5,741,083 | | 4/1998 | Schvartz .............................. 403/297 |

FOREIGN PATENT DOCUMENTS

0949424A2 10/1999 (EP) .

OTHER PUBLICATIONS

Mounting the Mask on Brick or Poured Concrete, Mounting the Mast, p. 21.
Mounting the Mast on Solid Wood, Mounting the Mast, p. 20.
Titus—Cam and dowel fittings Quickfit, p. 21 and 22.

* cited by examiner

Primary Examiner—Neill Wilson
(74) Attorney, Agent, or Firm—Jacobson & Johnson (57) ABSTRACT

An elongate fastener is provided for securing a pair of panels together wherein the panels includes respective bores therein. Each end of the fastener includes an expansible end portion thereon which is arranged to be received within the respective bore. A wedge member is mounted within each expansible end portion for longitudinal sliding movement between a disengaged position and an engaged position wherein the expansible end portions are expanded relative to the disengaged position. An actuator is located centrally between the expansible end portions for pivotal movement about an actuator axis which lies perpendicularly to a longitudinal axis of the fastener. The fastener permits a pair of panels to be mounted with one end of one panel abutted against the other panel wherein the actuator is accessible from a recessed installation aperture on an inner face of one of the panels. The resulting joint is secure while being hidden from view using a one-piece fastener.

23 Claims, 7 Drawing Sheets

DOUBLE ENDED EXPANSION FASTENER

FIELD OF THE INVENTION

This invention relates to a dual acting one piece fastener for fastening a pair of objects together and more particularly to a fastener for coupling furniture parts together.

BACKGROUND

Various types of fasteners are used for assembly of furniture and the like wherein it is desirable to make use of a fastener which is strong yet simple and quick to use. This includes the commercial assembly of cabinets and the like as well as assembly of furniture at the factory by professionals. The ready to assemble (RTA) furniture industry is one particular example involving furniture which is sold to the customer in a disassembled form that makes use of appropriate fasteners such that the customer is able to assemble the furniture in their homes using conventional tools. Fasteners designed for this use are preferably easy to use by the general public, while being secure and well hidden upon assembly of the RTA furniture.

An example of a fastener for RTA furniture is illustrated in European Application No. 0 949 424 to Hafele GmbH & CO. That application discloses a fastener for use in mounting a pair of panels together wherein the fastener includes a first expansible wedge member arranged to mount in a bore in one of the panels and a second expansible wedge member arranged to mount in a bore in the other panel. An actuator for the wedges is located at one end of the fastener such that the second wedge member is located centrally on the fastener and oriented such that upon assembly, an apex of the second wedge member is directed inwardly towards the panel securing the second wedge member therein. This occurs due to the location of the actuator at one end of the fastener which requires both wedges to be oriented in the same direction in order to make use of a common actuator. In this orientation, expansion of the second wedge member causes a wedging action to urge the fastener out of the panel instead of drawing the panels together. Furthermore, the first and second wedge members require different bore sizes in which to be received which results in added tooling and manufacturing costs when forming the panels.

SUMMARY

According to the present invention there is provided a fastener for securing together a pair of opposing objects having respective bores therein, the fastener comprising:

an elongate housing having first and second expansible portions at respective ends thereof for being slidably received within the respective bores;

first and second wedge members mounted adjacent the respective ends of the housing for engagement with the respective first and second expansible portions thereof, the wedge members and the respective expansible portions being mounted for sliding movement relative to one another in a longitudinal direction of the housing between a disengaged position and an engaged position wherein the wedge members are wedged within the respective expansible portions of the housing such that the expansible portions of the housing are expanded in a radial direction relative to the disengaged position; and an actuator mounted on the housing for rotation about an actuator axis extending transversely to the elongate housing at a location spaced between the wedge members, the actuator being coupled to the wedge members respectively for displacing the wedge members relative to the expansible portions between the engaged and disengaged positions as the actuator is rotated relative to the housing.

The present invention permits a pair of panels to be mounted together using a fastener of one-piece assembly which can be secured to the panels at opposite ends of the fastener unlike the prior art. The central location of the actuator permits the wedges to act in opposing directions which is desirable when drawing two panels together. The actuator located between the ends of the fastener and oriented radially or transversely further acts as a guide for aligning the fastener. Furthermore, the fastener of the present invention may be arranged to have ends of similar size which requires only one common bore size. This reduces the manufacturing cost of panels to be assembled as less tooling is required when using the fastener of the present invention.

The expansible portions of the housing may be mounted for longitudinal sliding movement relative to one another, the expansible portions of the housing being coupled to the actuator to be displaced towards one another from the disengaged to the engaged positions respectively. In this arrangement, the length of the fastener is reduced upon installation for drawing together a pair of objects to be coupled as the fastener is mounted therebetween.

In one arrangement, the wedge members are fixed in relation to the housing and the expansible portions are slidably mounted on the housing for movement towards each other as the expansible portions are displaced from the disengaged to the engaged positions.

Alternatively, the expansible portions may be fixed in relation to the housing and wherein the wedge members are slidably mounted on the housing for movement away from each other as the wedge members are displaced from the disengaged to the engaged positions.

In yet another arrangement, the housing may comprise first and second longitudinally extending portions wherein the first portion mounts the first expansible portion and the second wedge member in fixed relation thereon and the second portion mounts the second expansible portion and the first wedge member in fixed relation thereon, the first and second portions of the housing being slidably mounted relative to one another for displacing the wedge members relative to the respective expansible portions between the disengaged and the engaged positions respectively.

When the housing comprises first and second portions, there may be provided a longitudinally extending groove along an inner face of the first portion of the housing and a longitudinally extending protrusion on an inner face of the second portion of the housing such that the protrusion is arranged to mate with the groove while permitting longitudinal sliding movement therebetween.

In one arrangement, the wedge members are coupled to the actuator to be displaced inwardly together from the disengaged to the engaged position.

The actuator may comprise a cam pivotally mounted about the actuator axis and wherein there is provided a cam follower associated with each wedge member for urging the wedge members into the engaged position as the cam is rotated.

The cam may include a pair of diametrically opposed camming faces arranged to respectively engage the cam followers associated with the wedge members respectively.

The cam may include a raised circular protrusion extending axially from both ends thereof and wherein there is provided a longitudinal slot in each portion of housing arranged to receive the respective protrusions of the actuator therein for pivotally mounting the actuator on the housing while permitting relative sliding movement therebetween.

The cam preferably has an arcuate profile arranged to engage the cam followers with an increasing radial dimension as the cam is pivoted from the disengaged position to the engaged position.

At least one of the cam followers may have a profile with a notch thereon to resist rotation of the cam from the engaged position to the disengaged position once the cam has been rotated past the notch.

The first and second expansible portions may be substantially equal in diameter. In this arrangement, only one size of bore is required to simplify manufacturing of the panels.

The expansible portions preferably each include a plurality of fins extending radially outward to respective penetrating free ends at a respective periphery thereof such that the fins are penetrated into the respective inner surfaces of the bores when the expansible portions are expanded.

In one embodiment, there may be provided a flexible tension member coupled between the first and second wedge members, wherein the actuator comprises a pivotal member having an aperture which receives the tension member therethrough such that rotation of the pivotal member about the actuator axis causes the tension member to be wrapped about the pivotal member thereby drawing the wedge members longitudinally inward towards each other. The use of a flexible tension member allows unlimited travel of the wedges as opposed to the fixed amount of displacement when using a cam actuator. This permits less restrictive tolerances in bore sizes and bore placement when forming panels to be mounted together using the fasteners of the present invention.

There may be provided lock means for resisting rotation of the pivotal member corresponding to displacement of the wedge members from the engaged position to the disengaged position. For example, the pivotal member may comprise a screw which is threaded through housing into the corresponding one of the panels receiving the fastener therein.

The wedge members may be substantially conical in shape. In this arrangement, the inner surface of each expansible portion preferably comprises a conical mating surface arranged to engage the respective wedge members therein evenly about a circumference thereof.

In one embodiment, the conical shaped wedge members are oriented such that the respective apexes thereof are pointed towards each other.

The housing may be tubular, having a substantially constant diameter between respective ends thereof. This is particularly useful when using the fastener for aligning purposes as no further dowels are required in this arrangement. The expansion of the ends of the fastener further acts to align objects to be mounted together as the diameter of the housing in the disengaged position can be smaller than the diameter of the respective bores so that tolerance in bore alignment is less critical.

According to a further aspect of the present invention there is provided a fastener for securing together opposing objects having respective bores therein, the fastener comprising:

a pair of elongate members each having a wedge at a first end and an expansible portion at a second end thereof, the wedge of each member being located adjacent the expansible portion of other member, spaced longitudinally inward therefrom in a disengaged position, the elongate members being slidable relative to one another in a longitudinal direction of the members from the disengaged position to an engaged position wherein the wedge of each member is wedged within the expansible portion of the other member such that the expansible portions are expanded radially and displaced inwardly towards each other relative to the disengaged position; and stop means associated with the respective members for engaging the respective objects as the ends of the members are inserted into the respective bores;

whereby displacement of the objects towards one another engages the stop means to displace the expansible ends inwardly towards each other with the objects into the engaged position thereof.

The stop means may comprise a radially extending protrusion on one of the members at a location spaced between the respective ends of the member.

BRIEF DESCRIPTION OF THE DRAWINGS

In the accompanying drawings, which illustrate exemplary embodiments of the present invention.

DETAILED DESCRIPTION

Figure 1:
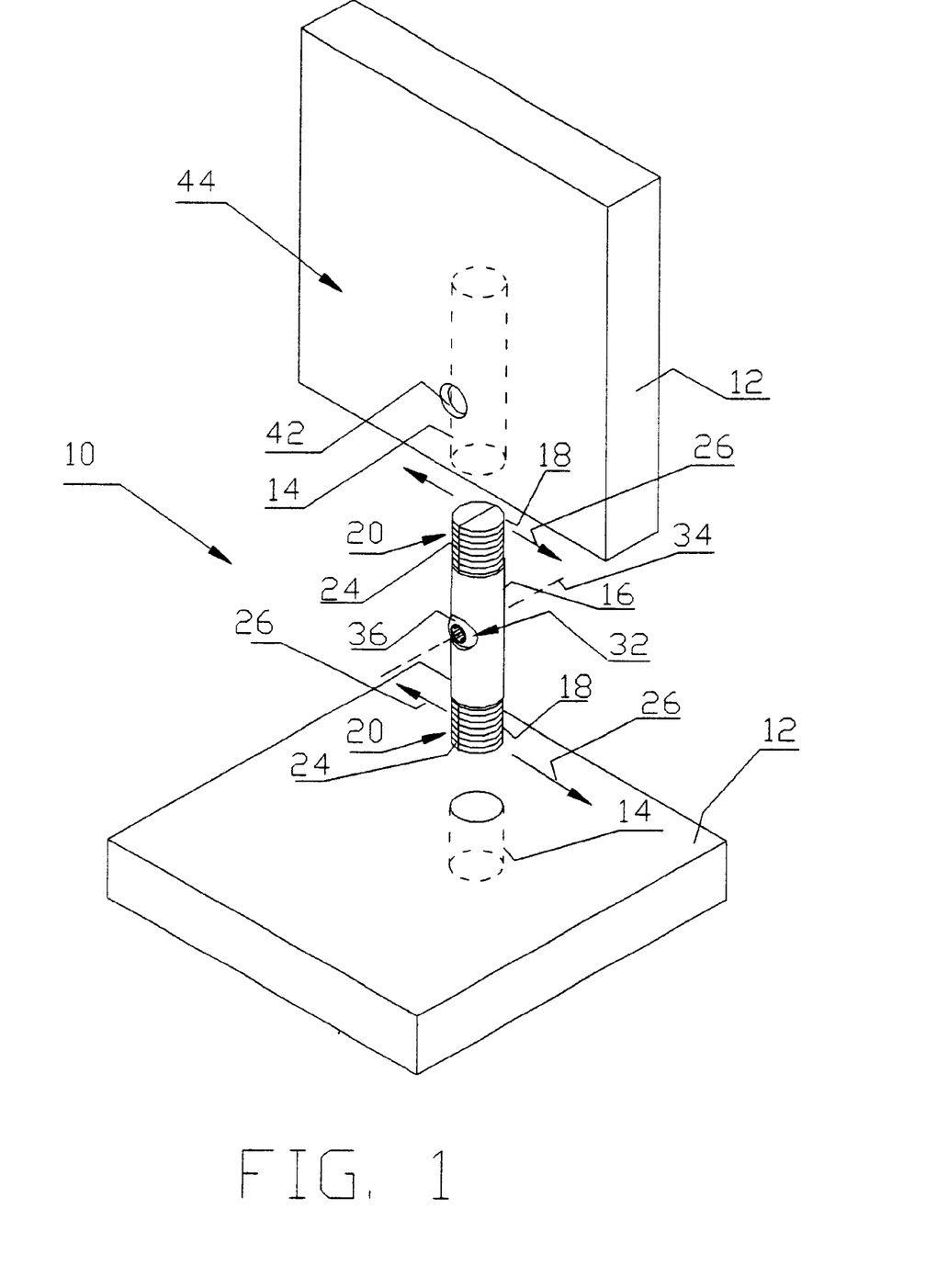
FIG. 1 is an isometric view of a first embodiment of the present invention shown as it would be installed between a pair of panels to be joined.

Referring to the accompanying drawings, there is illustrated a fastener generally indicated by reference numeral 10. The fastener is for use in joining a pair of opposing panels 12 each having a respective bore 14 therein. In the arrangement of FIG. 1, one of the panels shown is an edge bored panel while the opposing surface comprises a face bored panel wherein each bore is arranged to receive an end of the fastener therein for joining the panels. This is a typical arrangement when securing ready to assembly furniture and the like.

Figure 2:
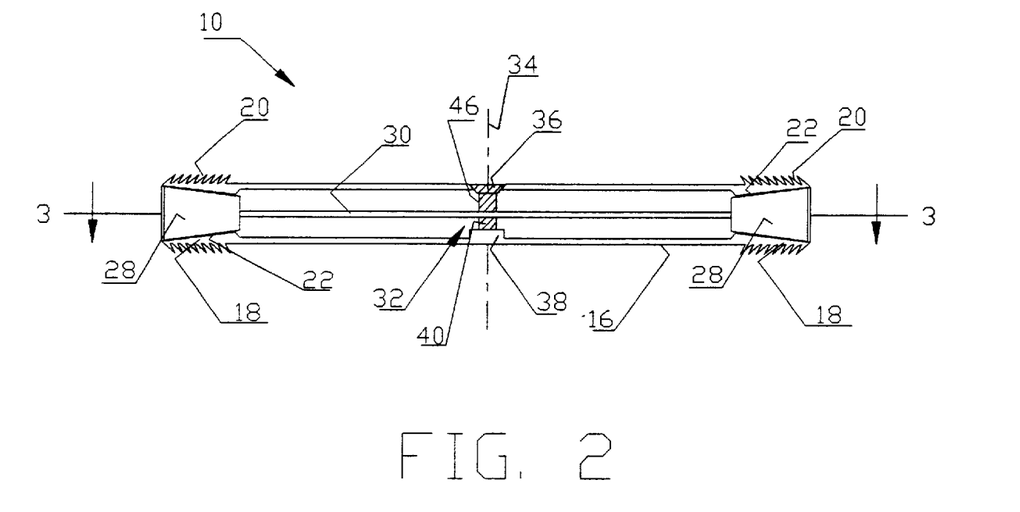
FIG. 2 is a sectional side elevational view of the fastener of FIG. 1 in a disengaged position.
Figure 3:
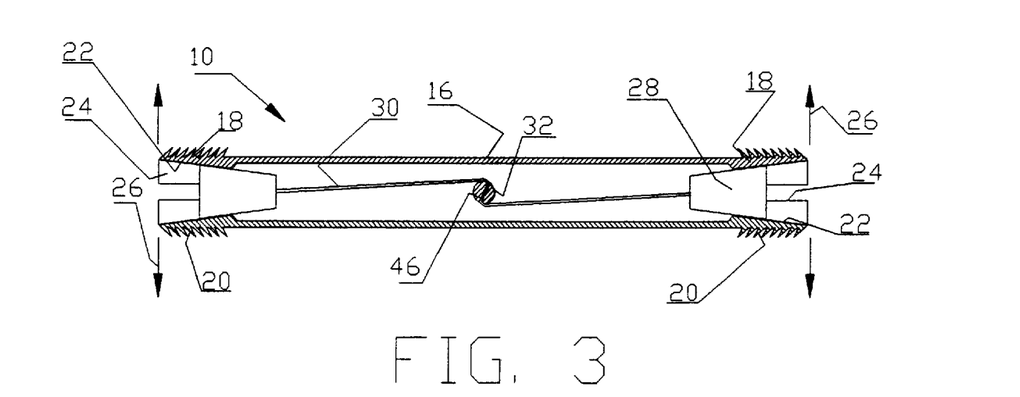
FIG. 3 is a sectional view along the line 3—3 of FIG. 2 in an engaged position.

In a first embodiment of the present invention as shown in FIGS. 1 through 3, the fastener 10 includes an elongate tubular housing 16 having an expansible portion 18 located at each end of the housing. The expansible portions are generally cylindrical extensions of the housing having a gripping outer surface 20 for engaging within one of the respective bores 14 of the panels to be joined. The expansible portions are arranged to be expanded in a radial direction once installed in the respective bores to sufficiently secure the fastener within the bore upon installation.

An inner face 22 of each expansible portion is generally conical in shape having an inwardly extending apex such that the inner face 22 of the respective expansible portions are tapered inwards towards each other. Each expansible portion 18 includes at least one longitudinally extending expansion slot 24 to permit expansion thereof in a direction indicated by arrow 26 primarily along a plane including the longitudinal axis of the housing and arrow 26.

A pair of wedge members 28 are mounted within the respective expansible portions 18 for sliding movement therein. Each wedge member 28 is frustoconical in shape having an inwardly extending apex such that the wedge members are tapered inwardly towards each other for mating with the respective inner faces 22 of the expansible portions 18. As shown in a disengaged position of FIG. 2 the wedge members mate with the respective expansible portions with the expansible portions being in a relaxed position with a diameter substantially equal to that of the housing 16. As the wedge members are displaced inwardly as shown in FIG. 3 in an engaged position, the members 28 act as a wedge to expand the expansion slots 24 of the respective expansible portions 18 thus expanding the portions 18 in the direction of arrow 26.

A tension member 30 in the form of a flexible wire extends between the respective wedge members 28 for mounting the wedge members on the respective ends thereof. In one arrangement the wedge members are hollow members having an aperture at an apex thereof for receiving the wire therethrough wherein a ball is mounted on the end of the wire of greater diameter than the aperture in the wedge member so as to securely mount the wedge member in tension thereon.

An actuator is provided in the form of a pivotal member 32 which is mounted centrally within the housing for rotation about an actuator axis 34 which extends substantially perpendicularly to a longitudinal axis of the housing as well as being oriented substantially perpendicularly to the direction of expansion indicated by arrow 26. The actuator axis thus lies perpendicularly to the plane within which the expansible end portions primarily expand. An outer end 36 of the pivotal member includes a conventional socket thereon for connection to a screwdriver, for example, to rotate the pivotal member 32 as desired.

A pivotal mount 38 pivotally mounts the inner end 40 of the pivotal member thereon. An aperture is provided in the housing for receiving the outer end 36 of the pivotal member therethrough to permit access to the socket thereon. In use the outer end 36 of the pivotal member 32 is aligned with an installation aperture 42 in an outer surface 44 of one of the panels 12 to be joined together as shown in FIG. 1.

The pivotal member 32 includes a radially extending aperture 46 therethrough for receiving the tension member 30 which is threaded through the aperture 46. In this arrangement, as the pivotal member 32 is rotated, the tension member 30 is wrapped around the pivotal member 32 as shown in FIG. 3 for providing tension to the tension member thus drawing the wedge members 28 inwardly to expand the respective expansible portions 18.

In use two panels 12 are oriented to be mounted together wherein one of the panels includes an installation aperture 42 as shown in FIG. 1. The fastener is inserted into the respective bores 14 such that the actuator axis 34 is aligned with the installation aperture 42 such that the socket on the outer end of the pivotal member 32 is accessible once the fastener has been inserted into the respective bores.

Rotation of the pivotal member as shown in FIG. 3 will displace the wedge members from the disengaged position to the engaged position, thus displacing two diametric halves of the respective expansible portion 18 in the direction indicated by arrow 26 along a diameter thereof which lies substantially parallel to the surface of the respective panels 12. The compression force which secures the fastener within the respective bores is thus directed in a plain along the surface of the panel as opposed to expanding the expansible portions in a direction extending transversely to the surfaces of the panels 12 which would result in puckering of the faces of the panels 12 resulting in an undesirable finish when used on furniture and the like.

The use of a flexible tension member allows unlimited travel of the wedges as opposed to the fixed amount of displacement when using a cam actuator. This permits less restrictive tolerances in bore sizes and bore placement when forming panels to be mounted together using the fasteners of the present invention.

Figure 4:
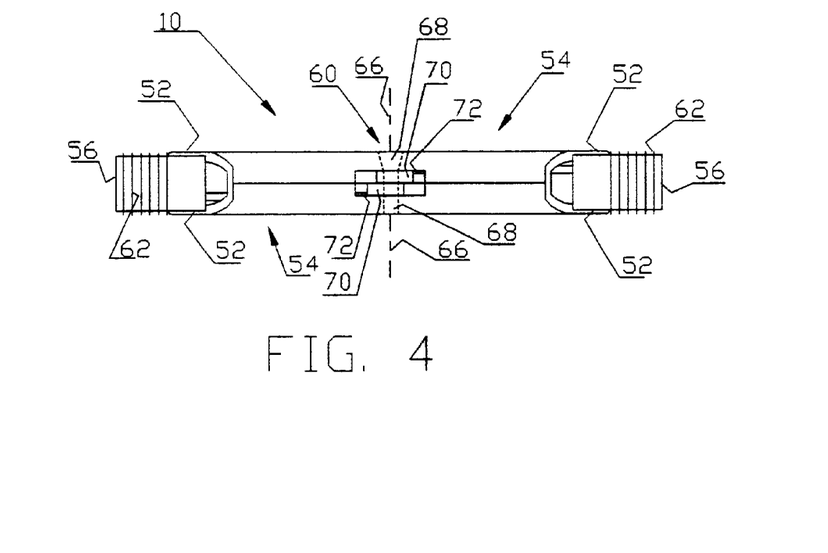
FIG. 4 is a side elevational view of a different embodiment of the fastener according to the present invention shown in a disengaged position.
Figures 5, 6:
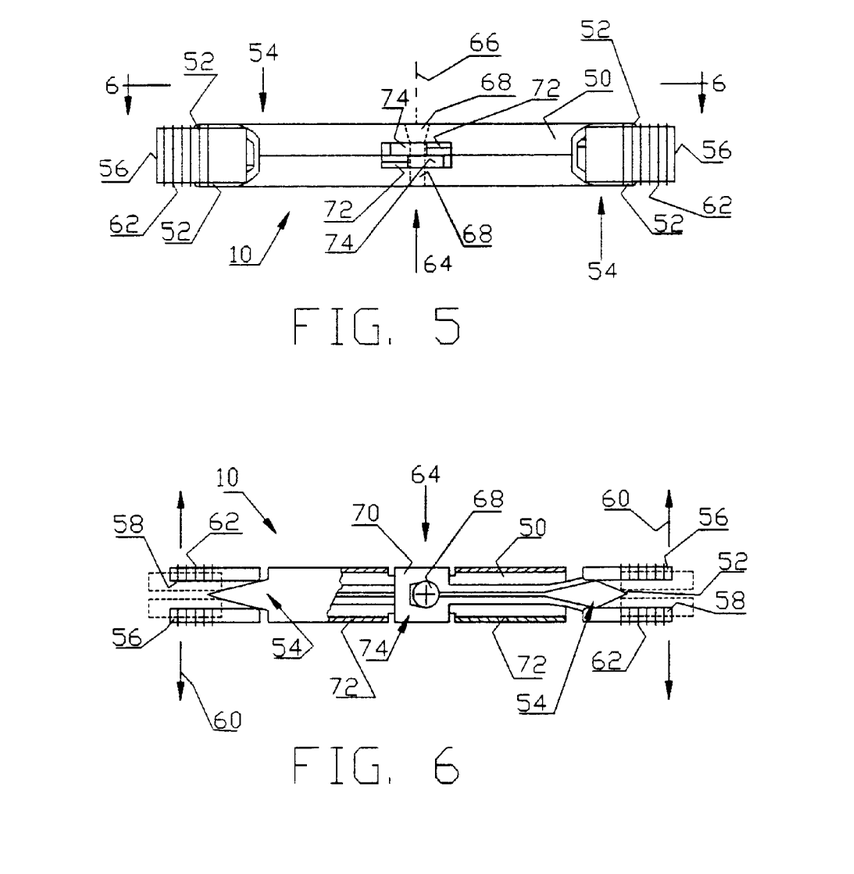
FIG. 5 is a side elevational view of the fastener of FIG. 4 shown in the engaged position.
FIG. 6 is a partly sectional view along the line 6—6 of FIG. 5.

In an alternate embodiment as shown in FIGS. 4 through 6 there is provided an elongate tubular housing which is formed from two longitudinally extending halves which are assembled together. Each half of the tubular housing includes a pointed end 52 such that the assembled housing includes a hollow interior having tapered ends defining respective wedge members 54 at respective ends thereof.

A pair of expansible end portions 56 are mounted on the respective ends of the housing for sliding movement relative to the housing and the wedge members 54 which are integrally formed thereon. Each expansible end portion 56 comprises a cylindrical plug formed in two halves by an expansion slot 58 extending axially therethrough. The expansion slots 58 are aligned with the respective apexes of the wedge members 54 such that the wedge members force the two halves of the respective expansible end portions radially outward as the expansible portions 56 are slidably displaced inwardly towards each other from a disengaged position with the wedge members to an engaged position therewith. The expansible end portions are thus expanded primarily in a radial direction indicated by arrow 60. The expansible end portions also include ridges 62 thereon to increase the gripping force of the ends of the fastener within the respective bores similarly to the first embodiment.

An actuator in the form of a pivotal member 64 is mounted centrally within the housing for pivotal movement about an actuator axis 66 which is oriented perpendicularly to a longitudinal axis of the housing as well the direction indicated by arrow 60. The pivotal member 64 includes a raised circular protrusion 68 at each end thereof to be received within respective mounting apertures in the housing 50 for pivotally mounting the pivotal member 64 thereon. The pivotal member further includes a pair of axially spaced and diametrically opposed cams 70, each being arranged to be associated with a respective expansible end portion 56 for displacing the expansible end portions between the respective disengaged and engaged positions as the pivotal member 64 is rotated.

A pair of link members 72 are coupled between the respective cams 70 and their associated expansible end portions 56. Each link member includes an inner end having an opening therein which defines a cam follower 74 for receiving a corresponding one of the cams 70 therein. An outer end of each link member 72 couples the two halves of the respective expansible end portion thereon at a respective base thereof such that the two halves are resiliently coupled together. The link members 72 act as tension members between the expansible end portions and the cams 70 for pulling the expansible end portions over the wedges into the engaged position as shown in FIG. 6 when the cams 70 are rotated. A portion of the opening of each inner end of the link members which faces the expansible end portion associated therewith is arranged to engage the corresponding cam 70 wherein the cam has an increasing radial dimension at a point of contact as it is rotated from the disengaged to the engaged positions so as to pull the expansible end portions inward.

In use the fastener is installed into a pair of panels as similarly described in FIG. 1 for producing a tight fifting joint therebetween. In this particular arrangement, as the pivotal member 64 is rotated by a socket on one end thereof, the expansible end portions are pulled inward towards each other as they are simultaneously expanded for pulling the surfaces 12 to be mounted together towards each other while the expansible end portions are gripped within the respective bores 14 resulting in a particularly secure and tightened joint.

Figure 7:
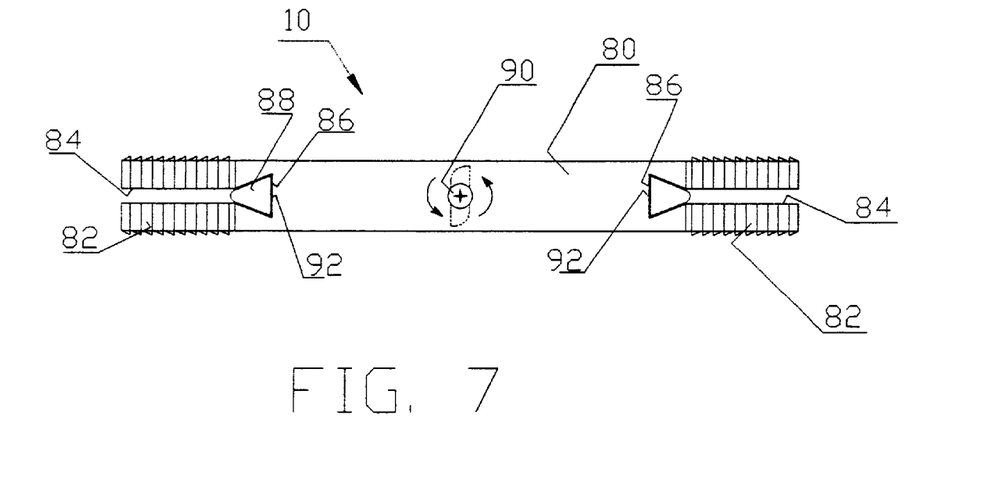
FIG. 7 is a top plan view of a further embodiment of the present invention shown in a disengaged position.
Figure 8:
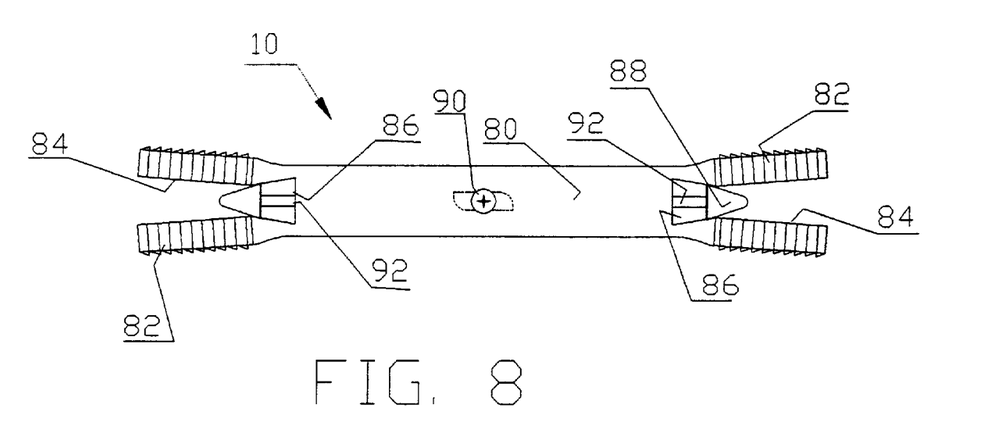
FIG. 8 is a top plan view of the fastener of FIG. 7 shown in an engaged position.

A third embodiment of the present invention is illustrated in FIGS. 7 and 8. An elongate tubular housing 80 is provided having integrally mounted expansible end portions 82 at respective ends thereof. Similarly to the previous embodiment the expansible end portions are formed in two halves by an expansion slot 84 extending longitudinally therethrough. The two halves of the expansible end portions are resiliently coupled together at there respective inner ends by the housing 80. An inner end 86 of each expansion slot 84 is generally triangular in shape having an outwardly extending apex which tapers towards an outer end of the respective slot. The inner ends 86 of the respective expansion slots 84 are thus arranged to each receive a triangular shaped wedge member 88 therein wherein the wedge members are oriented with an outwardly extending apex so as to mate with the inner ends of the respective expansion slots.

An actuator in the form of a pivotal member 90 is provided similarly to the previous embodiment of FIGS. 4 through 6. A pair of link members 92 are coupled between respective cams on the pivotal member 90 and the respective wedge members 88 so as to slidably displace the wedge members 88 in a longitudinal direction within the respective expansion slots 84. As the pivotal member 90 is rotated, the cams thereon engage a portion of an opening in the inner ends of the respective link members 92 which faces away from the wedge member 88 associated therewith. Thus as the cams are rotated the cams are arranged to push the wedges outwardly from the disengaged position to the engaged position for resiliently deforming the expansible end portions radially outward in a direction substantially perpendicular to an axis of the pivotal member 90.

In this arrangement pivotal deflection of a centrally located actuator acts to expand respective ends of the housing within respective bores in a pair of mating panels without drawing the expansible end portions inwardly such that the housing is substantially equal in length in both the engaged and disengaged positions thereof.

Figure 9:
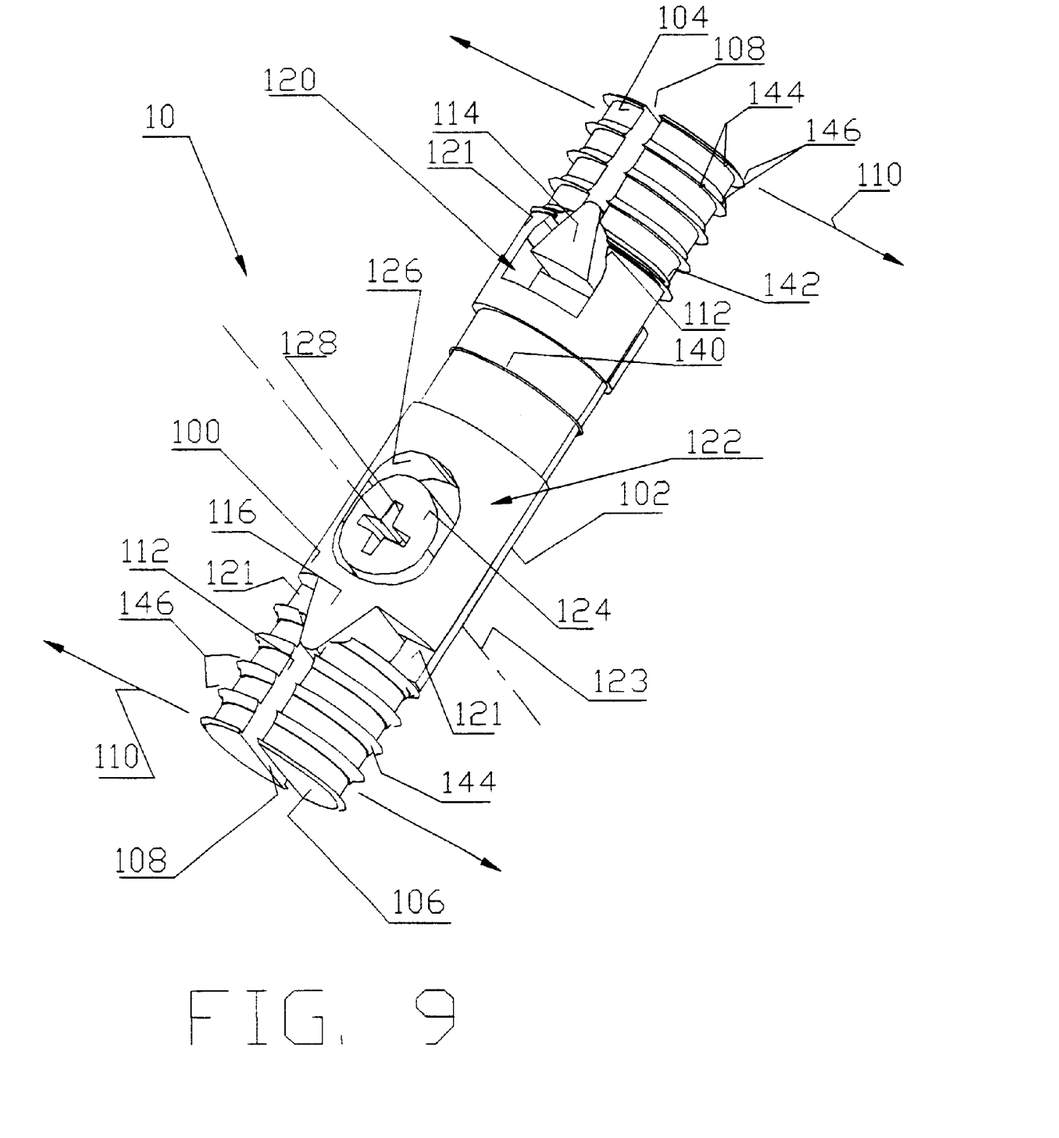
FIG. 9 is an isometric view of yet another embodiment of the present invention.
Figure 10:
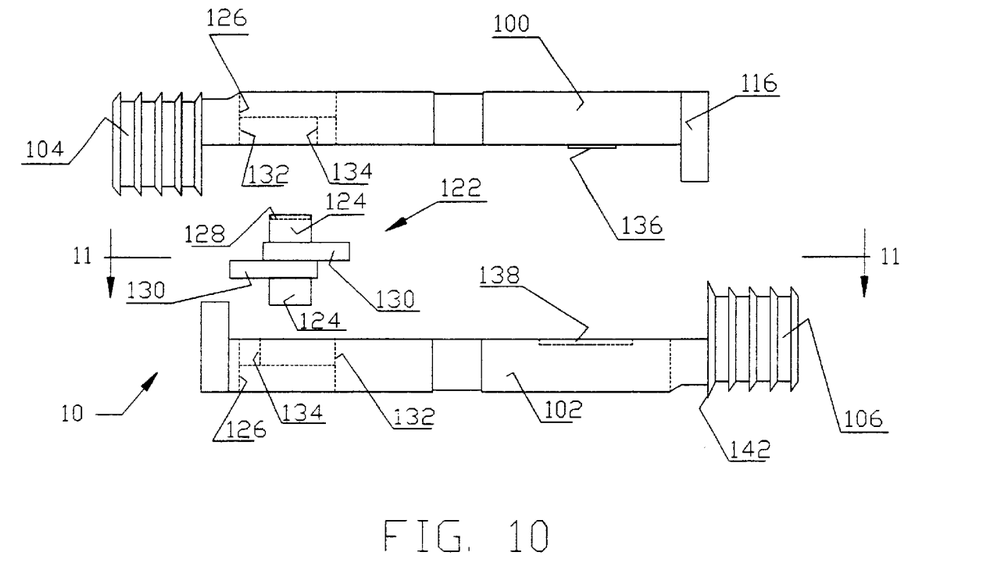
FIG. 10 is an exploded side elevational view of the fastener according to FIG. 9.
Figure 11:
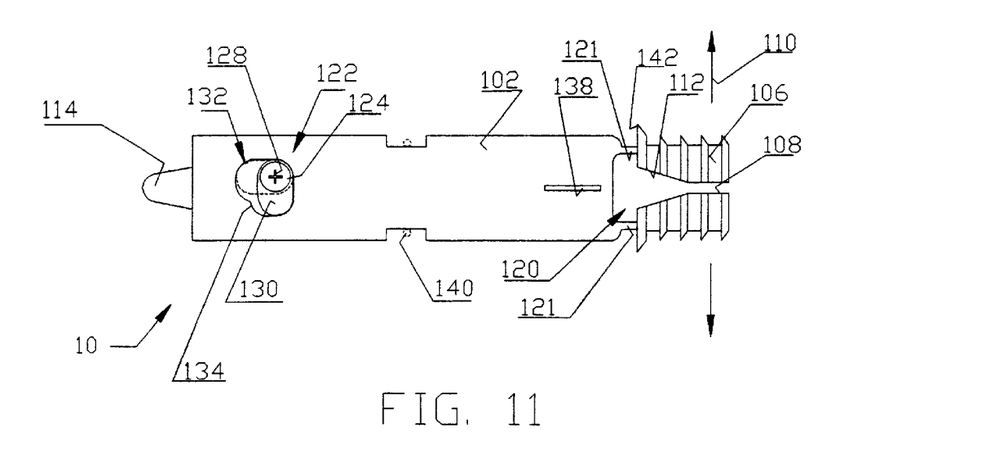
FIG. 11 is a top view along the line 11—11 of FIG. 10.

A further embodiment of the present invention is illustrated in FIGS. 9 through 11 wherein the fastener 10 includes a cylindrical housing having first and second longitudinally extending halves 100 and 102 mounted for longitudinal sliding movement therebetween. The first and second halves 100 and 102 of the housing include respective first and second expansible end portions 104 and 106 integrally mounted thereon at opposing ends of the housing. As described in previous embodiments each expansible end portion comprises a cylindrical plug having a longitudinally extending expansion slot 108 extending therethrough to permit expansion thereof in a direction indicated by arrow 110.

The inner ends 112 of the expansion slots 108 are triangular in shape having an outwardly extending apex such that each slot 108 is tapered towards an outer end thereof.

First and second wedge members 114 and 116 are positions adjacent the inner end of the expansion slots 108 of the respective first and second expansible end portions 104 and 106. Each wedge member 114 and 116 is a bell shaped member which tapers outwardly for mating with the respective inner ends 112 of the respective expansion slots 108. An opening 120 adjacent the inner end 112 of each expansion slot receives the corresponding wedge member therein in a disengaged position which permits the two halves of the expansible end portions to remain in a relaxed position having substantially the same diameter as the assembled cylindrical housing. Sliding each wedge member longitudinally outward relative to the respective expansible end portion forces the wedge member into the expansion slot 108 thus expanding the expansible end portions radially outward in the direction indicated by arrow 110. A pair of levers 121 are formed integrally within the housing on each side of the openings 120 for mounting the respective halves of the expansible portions thereon such that an inner end of the lever acts as a pivotal mount when flexed as the expansible portions are expanded. The expansible portions are thus displaced in an arc about the inner end of each lever 121 as they are expanded into the engaged position.

The first wedge member 114 is mounted on an inner end of the second half 102 of the housing for sliding movement therewith relative to the first half of the housing 100. Similarly, the second wedge member 116 is mounted on the inner end of the first half 100 of the housing for sliding movement therewith relative to the second half 102 of the housing. The wedge members are thus displaced into and out of the respective expansion slots 108 by sliding the respective halves of the housing relative to one another.

An actuator in the form of a pivotal member 122 is mounted on the housing spaced between respective ends thereof but offset towards one end for pivotal movement about an actuator axis 123 extending perpendicularly to a longitudinal axis of the housing as well as being perpendicular to the direction indicated by arrow 110. A raised circular protrusion 124 extends axially from each end of the pivotal member 122 to be received in a pair of mounting slots 126 located in the respective halves of the housing to extend longitudinally therewith. The mounting slots 126 permit longitudinal sliding movement therebetween while securing the pivotal member therein for pivotal movement. A socket 128 is located at one end of the pivotal member.

The pivotal member 122 includes a pair of axially spaced and diametrically opposed cams 130 mounted thereon wherein each cam 130 is received within a corresponding recess 132 located in the respective inner face of the respective half of the housing 100 and 102 associated therewith. Each recess 132 thus defines a cam follower surface for engaging the respective cam 130 associated therewith. The cam profile is arranged to have an increasing radial dimension at a point of contact with the recess 132 as the cam is displaced from the disengaged to the engaged positions for displacing the halves of the housing relative to one another. Each recess 132 includes a notch 134 in a cam follower surface thereof such that the cam is permitted to rotate past the notch 134 when displaced from the disengaged to the engaged position. Once the cam has been rotated past the corresponding notch 134 however, rotation in the reverse direction from the engage position to the disengage position is restricted by the notch which thus acts as a stop.

A longitudinally extending protrusion 136 is mounted along the inner face of the first half 100 of the housing and is arranged to be received in a longitudinally extending groove 138 located in an inner face of the second half 102 of the housing. The groove 138 is longer than the protrusion 136 to permit longitudinal sliding movement therebetween while providing torsional support between the first and second halves of the housing.

The first and second halves 100 and 102 of the housing include a portion of reduced diameter centrally located thereon about an outer periphery thereof so as to receive an o-ring 140 therein or any other suitable clip for securing the halves together. The o-ring 140 snugly secures the first and second halves of the housing together while permitting longitudinal sliding movement therebetween. The section of reduced diameter of the housing permits the o-ring 140 to be recessed below an outer surface of the housing.

A stop 142 in the form of an annular flange is located at the inner end of one of the expansible end portions for the purposes of locating the stop adjacent the outer surface of a bore 14 in which the fastener is to be mounted.

The expansible portions each include a plurality of fins 144 extending radially outward to respective penetrating free ends 146 at a respective periphery thereof such that the fins are penetrated into the respective inner surfaces of the bores when the expansible portions are expanded.

In this arrangement rotation of the pivotal member 122 causes the cams 130 to engage the cam follower surfaces of the respective recesses 132 to slide the first and second halves 100 and 102 of the housing longitudinally inward such that the wedge members 114 and 116 are engaged within the respective expansion slots 108 to expand the expansible end portions along a plane perpendicular to the axis of the pivotal member 122 while simultaneously pulling the respective expansible end portions inwards towards each other to provide a force which pulls together a pair of opposing surfaces to be mounted together. The stop 142 assists in initially positioning one of the expansible end portions within the respective bore. Furthermore the penetration of the fins 144 into the respective bores secures a portion of the panel between each fin as opposed to only frictionally engaging the inner surface of the respective bores receiving the expansible portions therein. The added gripping force ensures the panels are sufficiently drawn together upon assembly of the fastener with the panels.

Figure 12:
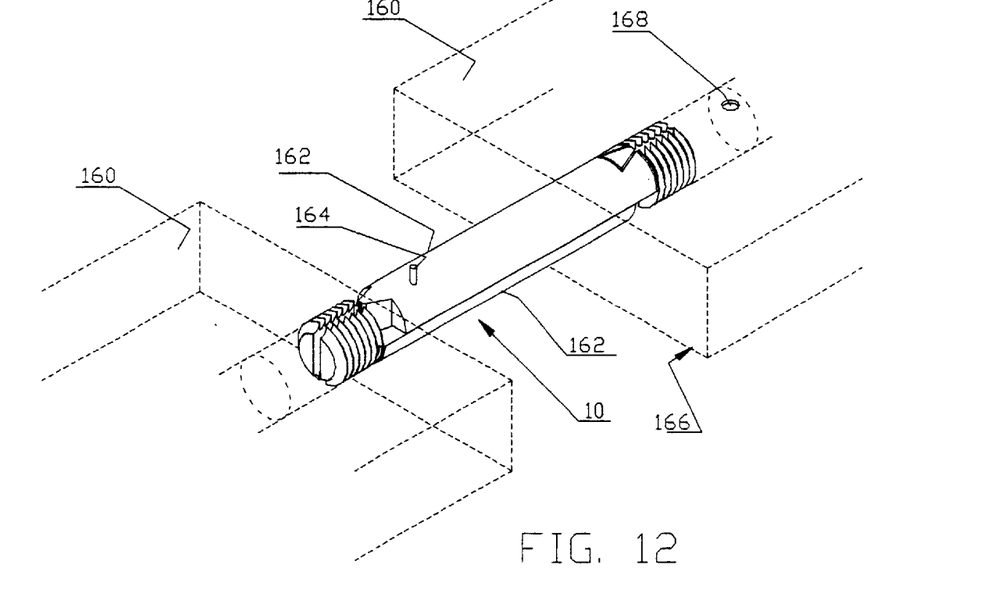
FIG. 12 is an isometric view of a further embodiment of the fastener shown mounting two panels in an edge to edge configuration.

A further embodiment is illustrated in FIG. 12 wherein a pair of edge bored panels 160 are shown being assembled by the fastener 10. The fastener of FIG. 12 includes a housing having two longitudinal halves 162 similar to the embodiment of FIGS. 9 through 11 wherein there is provided an expansible portion at one end and a wedge member at the other end of each half of the housing. The halves 162 are longitudinally slidable relative to one another for co-operation of the wedge members with the respective expansible portions as described above.

The actuator in the embodiment of FIG. 12 comprises a catch 164 which extends radially outward from an outer periphery of one half of the housing. The catch 164 acts as a stop arranged to engage an edge 166 of a corresponding one of the panels for expanding the expansible portions into the engaged position as the panels are displaced towards one another. The expansible portion opposite the catch bottoms out in the opposing bore such that the expansible portions are displaced into the engaged position as the panels are pushed together.

A release aperture 168 is mounted in one of the panels for alignment with one of the wedge members when the panels are coupled together such that the wedge member may be released from the corresponding expansible end portion by insertion of a tool through the aperture to engage the wedge member. The fastener according to FIG. 12 is thus selectively separable from the panels by using a conventional or screwdriver or the like.

In varying arrangements of the embodiment of FIG. 12 there may be provided a catch on both halves of the housing or the expansible ends may be arranged to bottom out within the respective bores. In either arrangement the panels engage the halves of the housing respectively to push them together as the panels are pushed together.

Figure 13:
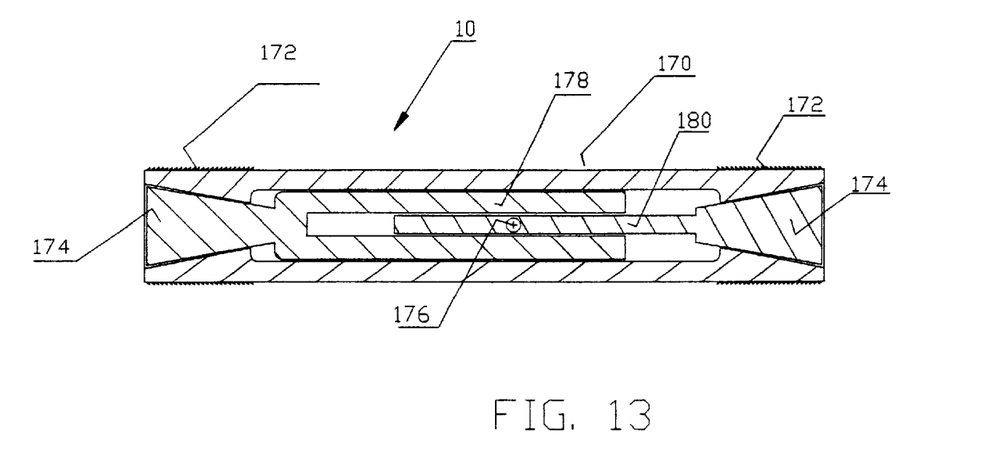
FIG. 13 is a sectional top view of another embodiment of the fastener.

In a further embodiment as illustrated in FIG. 13, the fastener 10 comprises a tubular housing 170 having expansible end portions 172 with respective wedge members 174 mounted therein similar to those described in the first embodiment. An actuator 176 is further provided in the form of a pivotal member having cams thereon as described above. A pair of link members couple the respective wedge members 174 to the actuator wherein one of the link members comprises a sleeve 178 and the other link member comprises a rod 180 which is arranged to be slidable received within the sleeve 178.

Referring now to variations of the first embodiment shown in FIGS. 1 through 3, the pivotal member 32 may be replaced with a screw which is threaded directly into or through the housing into the surrounding bore securing the fastener therein. Further arrangements of the pivotal mount 38 are also possible to assist in locking the pivotal member in place once rotated. This may include a rubber mount, a cam lock, or a ratchet mechanism. The pivotal member 32 may further be provided with a spring mechanism to urge the socket end thereof outwardly beyond an outer surface of the housing to assist in alignment with the installation aperture 42 in one of the panels to be mounted. In yet another arrangement the pivotal member 32 may be free rotating within the housing or provided with a ratchet or clutch mechanism as well as any other arrangement which would allow one end to expand first or to allow one end to expand more.

The tension member may comprise any band of material suitable for mounting under tension to draw the wedges inwardly while being sufficiently flexible to be wrapped about the pivotal member. When mounting the tension member on the wedge members it may be preferable to provide a slot along one side of the wedge members for receiving the tension member therethrough for ease of manufacture. Also for ease of manufacture it may be preferable to provide a two part housing hinged along one longitudinal side thereof for receiving the actuator, the wedge members and the tension member therein. The two part housing may be molded as one piece wherein the two halves are hinged together by flexing a connecting portion which connects the two halves.

Referring to the embodiment of FIGS. 9 through 11, the actuator may be modified so as to remain in a fixed longitudinal position relative to one of the halves of the housing such that only one cam 130 is required to engage the other half of the housing. In this arrangement, one half of the housing is longitudinally slidable relative to the other half of the housing in response to rotation of the actuator as similarly described in the embodiment of FIG. 9 through 11, however the actuator is simpler in design. In either variation of the fastener, the housing and actuator comprise only three parts which are simple to manufacture and reliable in construction.

Referring generally to either embodiment, further modifications include replacing the actuator with a rack and pinion arrangement wherein the pinion is arranged to rotate about the actuator axis and a pair of racks are provided which are operatively associated with each expansible end portion.

Although it is preferable to make use of a single standardised bore size it may be preferable in some instances to have the diameter of one expansible portion being greater than the other or to have only one end which expands or one end that expands greater than the other. This is particularly useful for on panels which have been manufactured using different standardised bore sizes.

The expansible portions may also be formed such that one is longer in length than the other. Elongating one of the expansible end portions is particular useful when gripping into a panel formed of lightweight material wherein a greater contact area between the expansible portion and the inner surface of the bore is desired.

When mounting panels in an edge to edge configuration as illustrated in FIG. 12, it may be useful to offset the actuator towards one end of the housing while providing a stop in the form of an annular flange about a center of the housing to position the fastener 10 evenly within both of the panels.

Further modifications to the pivotal member 32 include providing a lock mechanism such as a ratchet mechanism or a material with a coefficient of friction such as a securely fit rubber socket mounting one end of the pivotal member therein.

For ease of alignment of two opposing bores and for ease of insertion into the bores it may be preferable that an outer diameter of the housing be substantially equal to an outer diameter of the ridges surrounding the expansible end portions before expansion thereof. The housing is thus snugly fit within the bore while the expansible portions operate as described above. The use of dowels and glue for alignment of the panels is thus not required.

The outer end of the pivotal member may include any type of screw head or socket thereon which would permit controlled rotation thereof. For simplicity a conventional screw head is preferable such that only the use of conventional tools is required.

In order to have more control over the expansion of the respective ends of the housing, two actuators may be provided wherein one actuator is associated with each expansible end portion of the housing. In this arrangement the fastener may first be inserted into one panel and expanded therein before mounting the second panel on an opposite end of the fastener.

The shape of the wedge members may be generally triangular or bell shaped as well as any particular arrangement having a generally diminishing cross section in one longitudinal direction which defines a camming face operatively associated with the expansible end portions and the expansion thereof.

Depending on which particular arrangement or embodiment the fastener comprises, different selections of materials may be appropriate. The materials which form the fastener will generally include zinc castings, steel, plastic or any combination thereof. Any other material which would allow the fastener to function effectively would also be appropriate.

While various embodiments of the present invention have been described in the foregoing, it is to be understood that other embodiments are possible within the scope of the invention. The invention is to be considered limited solely by the scope of the appended claims.

What is claimed is:

1. A fastener for securing together a pair of opposing objects having respective bores therein, the fastener comprising:

an elongate housing having first and second expansible portions at respective ends thereof for being slidably received within the respective bores;

first and second wedge members mounted adjacent the respective ends of the housing for engagement with the respective first and second expansible portions thereof, the wedge members and the respective expansible portions being mounted for sliding movement relative to one another in a longitudinal direction of the housing between a disengaged position and an engaged position wherein the wedge members are wedged within the respective expansible portions of the housing such that the expansible portions of the housing are expanded in a radial direction relative to the disengaged position; and an actuator mounted on the housing for rotation about an actuator axis extending transversely to the elongate housing at a location spaced between the wedge members, the actuator being coupled to the wedge members respectively for displacing the wedge members relative to the expansible portions between the engaged and disengaged positions as the actuator is rotated relative to the housing.

2. The fastener according to claim 1 wherein the expansible portions of the housing are mounted for longitudinal sliding movement relative to one another, the expansible portions of the housing being coupled to the actuator to be displaced towards one another from the disengaged to the engaged positions respectively.

3. The fastener according to claim 1 wherein the actuator comprises a cam pivotally mounted about the actuator axis and wherein there is provided a cam follower associated with each wedge member for urging the wedge members into the engaged position as the cam is rotated.

4. The fastener according to claim 3 wherein the wedge members are fixed in relation to the housing and wherein the expansible portions are slidably mounted on the housing for movement towards each other as the expansible portions are displaced from the disengaged to the engaged positions.

5. The fastener according to claim 3 wherein the expansible portions are fixed in relation to the housing and wherein the wedge members are slidably mounted on the housing for movement away from each other as the wedge members are displaced from the disengaged to the engaged positions.

6. The fastener according to claim 3 wherein the housing comprises first and second longitudinally extending portions wherein the first portion mounts the first expansible portion and the second wedge member in fixed relation thereon and the second portion mounts the second expansible portion and the first wedge member in fixed relation thereon, the first and second portions of the housing being slidably mounted relative to one another for displacing the wedge members relative to the respective expansible portions between the disengaged and the engaged positions respectively.

7. The fastener according to claim 3 wherein the cam includes a pair of diametrically opposed camming faces arranged to respectively engage the cam followers associated with the wedge members respectively.

8. The fastener according to claim 6 wherein the cam includes a raised circular protrusion extending axially from both ends thereof and wherein there is provided a longitudinal slot in each portion of housing arranged to receive the respective protrusions of the actuator therein for pivotally mounting the actuator on the housing while permitting relative sliding movement therebetween.

9. The fastener according to claim 6 wherein there is provided a longitudinally extending groove along an inner face of the first portion of the housing and a longitudinally extending protrusion on an inner face of the second portion of the housing such that the protrusion is arranged to mate with the groove while permitting longitudinal sliding movement therebetween.

10. The fastener according to claim 1 wherein the wedge members are coupled to the actuator to be displaced inwardly together from the disengaged to the engaged position.

11. The fastener according to claim 3 wherein the cam has an arcuate profile arranged to engage the cam followers with an increasing radial dimension as the cam is pivoted from the disengaged position to the engaged position.

12. The fastener according to claim 11 wherein at least one of the cam followers has a profile with a notch thereon to resist rotation of the cam from the engaged position to the disengaged position once the cam has been rotated past the notch.

13. The fastener according to claim 1 wherein the first and second expansible portions are substantially equal in diameter.

14. The fastener according to claim 1 wherein the expansible portions each include a plurality of fins extending radially outward to respective penetrating free ends at a respective periphery thereof such that the fins are penetrated into the respective inner surfaces of the bores when the expansible portions are expanded.

15. The fastener according to claim 1 wherein there is provided a flexible tension member coupled between the first and second wedge members and wherein the actuator comprises a pivotal member having an aperture which receives the tension member therethrough such that rotation of the pivotal member about the actuator axis causes the tension member to be wrapped about the pivotal member thereby drawing the wedge members longitudinally inward towards each other.

16. The fastener according to claim 15 wherein there is provided lock means for resisting rotation of the pivotal member corresponding to displacement of the wedge members from the engaged position to the disengaged position.

17. The fastener according to claim 15 wherein the pivotal member comprises a screw which is threaded through housing.

18. The fastener according to claim 15 wherein the wedge members are substantially conical in shape.

19. The fastener according to claim 18 wherein an inner surface of each expansible portion comprises a conical mating surface arranged to engage the respective wedge members therein evenly about a circumference thereof.

20. The fastener according to claim 18 wherein the conical shaped wedge members are oriented such that respective apexes thereof are pointed towards each other.

21. The fastener according to claim 1 wherein the housing is tubular, having a substantially constant diameter between respective ends thereof.

22. A fastener for securing together opposing objects having respective bores therein, the fastener comprising:
   a pair of elongate members each having a wedge at a first end and an expansible portion at a second end thereof, the wedge of each member being located adjacent the expansible portion of other member, spaced longitudinally inward therefrom in a disengaged position, the elongate members being slidable relative to one another in a longitudinal direction of the members from the disengaged position to an engaged position wherein the wedge of each member is wedged within the expansible portion of the other member such that the expansible portions are expanded radially relative to the disengaged position; and
   stop means associated with each of the members for engaging the respective objects as the ends of the members are inserted into the respective bores, whereby on displacement of the objects towards one another, the objects engage the stop means to displace the expansible ends inwardly towards each other and into the engaged position thereof.

23. The fastener according to claim 22 wherein the stop means comprises a radially extending protrusion on one of the members at a location spaced between the respective ends of the member.

* * * * *